FIG. 2

March 9, 1965     D. M. BARRETT ETAL     3,173,011
CARRIAGE FOR FRONT LOADED SPOT FILMER
Original Filed Dec. 28, 1961     4 Sheets-Sheet 3

INVENTORS.
DAVID M. BARRETT
EDGAR J. BASTIN
MICHAEL HURA
BY *Watts & Fisher*
ATTORNEYS.

March 9, 1965   D. M. BARRETT ETAL   3,173,011
CARRIAGE FOR FRONT LOADED SPOT FILMER
Original Filed Dec. 28, 1961   4 Sheets-Sheet 4

INVENTORS.
DAVID M. BARRETT
EDGAR J. BASTIN
MICHAEL HURA
BY  Watts & Fisher
ATTORNEYS.

000
United States Patent Office 3,173,011
Patented Mar. 9, 1965

3,173,011
CARRIAGE FOR FRONT LOADED SPOT FILMER
David M. Barrett, Lyndhurst, Edgar J. Bastin, Chesterland, and Michael Hura, Cleveland, Ohio, assignors to Picker X-Ray Corporation, Waite Manufacturing Division, Inc., Cleveland, Ohio, a corporation of Ohio
Original application Dec. 28, 1961, Ser. No. 165,709. Divided and this application Nov. 19, 1962, Ser. No. 238,571
25 Claims. (Cl. 250—66)

This invention pertains to medical X-ray apparatus and more specifically to that class of radiographic devices which are now known in the art as spot filmers.

This application is a division of David M. Barrett et al. application S.N. 165,709, filed December 28, 1961, entitled Spot Filmer.

A medical X-ray table is generally equipped with a device known as a spot filmer. These spot filmers include a fluoroscopic screen, or in the alternative, an image intensification tube and an associated optical system or closed circuit television arrangement. A spot filmer also includes a mechanism for selectively and sequentially positioning a photographic film carried in a film cassette for a series of radiographic exposures.

In one class of spot filmer, a motor driven carriage is provided which selectively advances a cassette to a radiographic position, and thereafter moves a cassette through a predetermined sequence of positions. One mechanism of this class is described in United States Letters Patent 2,668,913, issued February 9, 1954, under the title, "Spot Filmer," while a more recent design is described and claimed in United States Letters Patent 2,767,323 issued October 16, 1956, under the title, "Serial Filmer." This invention is directed to an improved spot filmer which has certain definite advantages over those described and claimed in these two patents.

One of the disadvantages of the spot filmers described and claimed in these two patents is that they are of the so-called "top" loading type. That is, a cassette when positioned in the carriage is inserted through a loading aperture in the top of the spot filmer. This loading aperture in most spot filmers of the so-called "top" loading type is toward the rear of the housing. When an image intensification tube is secured to the spot filmer loading becomes quite difficult and awkward since the operator must reach around the tube and over the table and patient to position the cassette.

With this invention, a spot filmer of the so-called "front" loading class is provided. The complete mechanism is described in greater detail and claimed in the above referenced patent application. This case is directed to the cassette carriage of the front loaded spot filmer while other feature of the spot filmer are described and claimed in other divisional applications filed concurrently with this application. These other divisional applications are:

(1) Spot Filmer Drive System filed November 19, 1962, Serial No. 238,558.
(2) Spot Filmer With Radiation Shield filed November 19, 1962, Serial No. 238,482.

In the mechanism of this invention loading—and unloading—of a cassette into the cassette carriage is accomplished through a simple, direct, rectilinear movement through a loading aperture in the forward end of the spot filmer. Loading only requires inward pressure until the cassette is in place when it locks automatically while simply pressing a button results in automatic ejection of the cassette.

A novel cassette gripping mechanism wherein a cross carriage is mounted on the carriage and equipped with two relatively movable jaws is provided. The jaws are biased together and controlled so that their movement is at all times equal and opposite. When a cassette is inserted in the carriage, it is passed through the front load opening and inserted into the jaws which automatically move away from one another until they are spaced from one another the width of the cassette. The cassette is slid into supports on the jaws which resiliently grip the cassette. Accordingly, a novel and improved cassette-retaining mechanism is provided which will accept a cassette of any width between maximum and minimum limits.

In the usual spot filmer the operator may selectively expose, at one time, the entire, one-fourth, or one-half of a positioned sheet of film. When the selected sequence is one in which the film is exposed one quarter at a time or one in which the film is halved, cross travel of the cassette is required.

Another of the advantages of the invention resides in an interlock arrangement which prevents cross travel whenever a cassette of a width too large for such cross travel is in the carriage.

Accordingly, the object of this invention is to provide a novel and improved cassette supporting carriage for a spot filmer.

Other objects and a fuller understanding of the invention may be had by referring to the following description and claims taken in conjunction with the accompanying drawings, in which:

Referring now to the drawings, a spot filmer frame is shown generally at 20. A cassette carriage shown generally at 21 is mounted in the frame for rectilinear movement from a loading and unloading position of FIGURE 1 near the front of the spot filmer. The carriage 21 in its loading position is shown at the left in FIGURE 1. The carriage is movable from the loading position to a storage position at the rear of the spot filmer. The carriage 21 is advanced selectively and sequentially from the storage position to each exposure position of a selected series.

Figure 1:
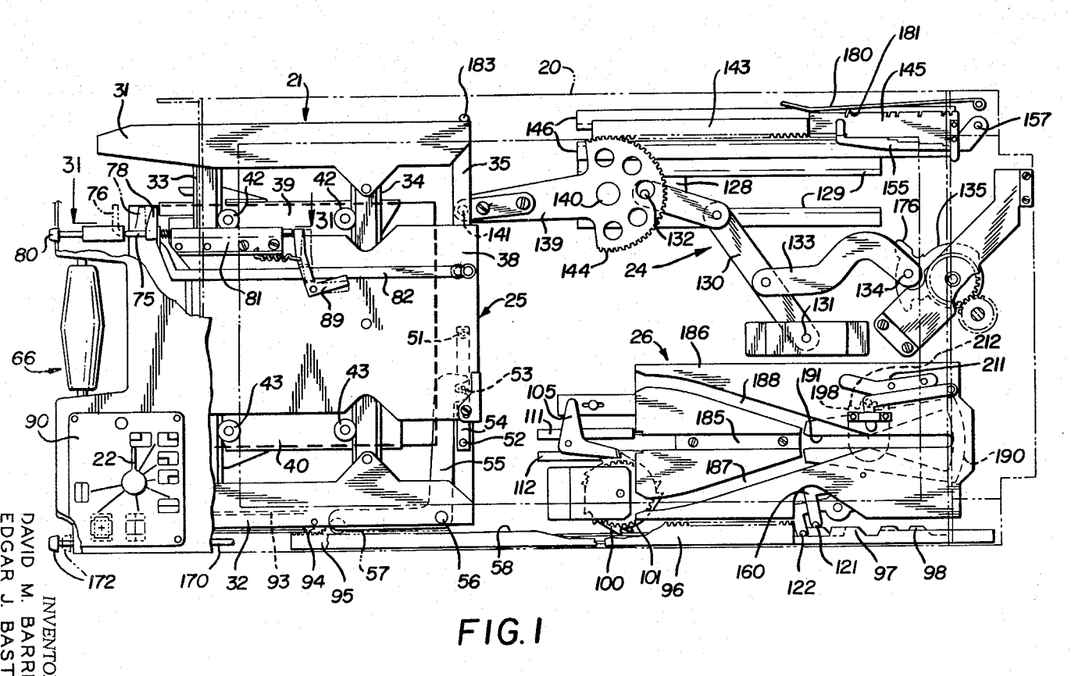
FIGURE 1 is a sectional view of the entire spot filmer mechanism in the loading position.

When a selector knob 22 is placed in the position of FIGURE 1 and thereafter the mechanism is repeatedly actuated four times, the carriage will selectively and sequentially travel to four positions which provide selective exposure, one at a time, of each of the four quadrants of a photographic film carried by the carriage 21. When the selector knob 22 is positioned in other positions, the carriage 21 will move sequentially from the storage position through other sequences (*a*) exposing the forward and rearward halves of one sheet of film, (*b*) halving the film along a longitudinal centerline, or (*c*) exposing the entire film.

The forward and rearward travel of the carriage 21 is controlled by a longitudinal travel producing assembly shown generally at 24. The longitudinal travel assembly 24 is in the upper right of FIGURE 1. Cross movement of a cross carriage 25 mounted on the carriage 21 is obtained through a cross movement control assembly 26 which is in the lower righthand corner of FIGURE 1. The details of construction of four mechanical sub-assemblies are described in greater detail in the parent application.

These four sub-assemblies are:
(1) The carriage 21;
(2) The position control assembly connected to the selector knob 22;
(3) The longitudinal travel assembly 24; and,
(4) The cross travel assembly 26.

To the extent required for an understanding of this invention, these four sub-assemblies will be described below under separate sections. Another section will define an electrical control circuit and its operation. Finally, a description of the operation of the device will follow the four sections describing the mechanical sub-assemblies, and the section defining the electrical control circuit.

The carriage

Figure 2:
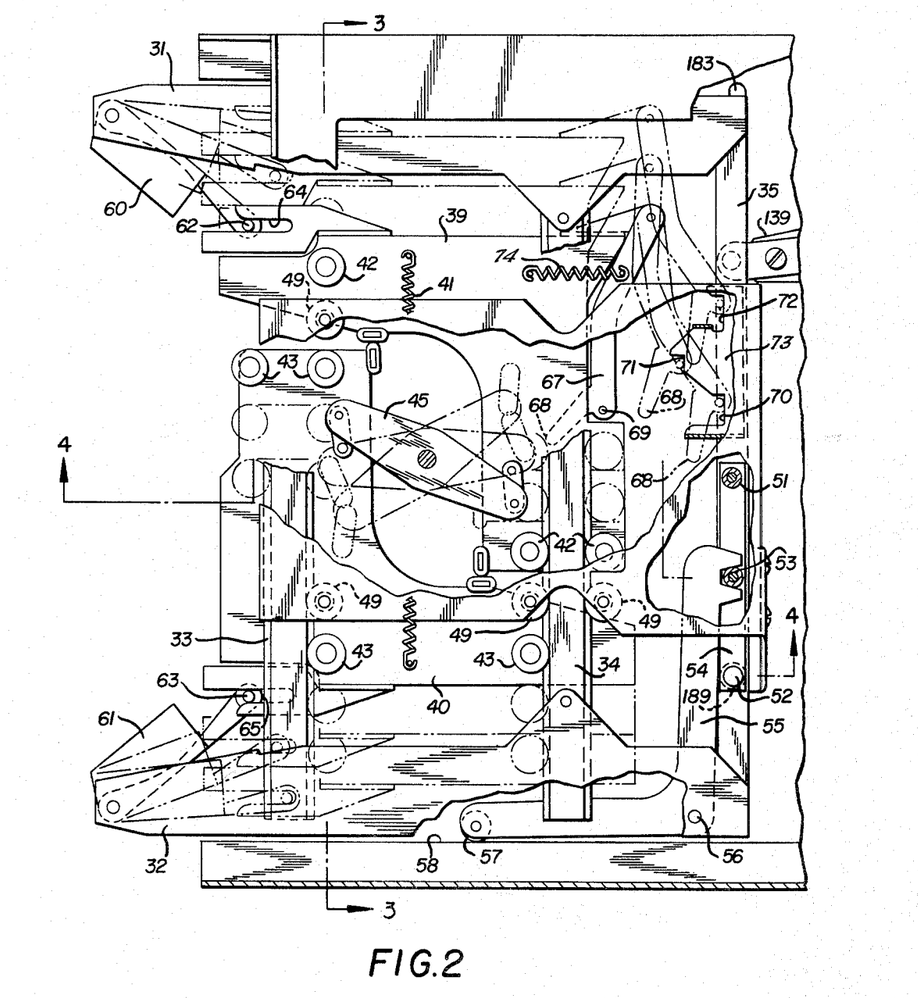
FIGURE 2 is an enlarged sectional view in the plane of FIGURE 1 of the forward end of the spot filmer showing the cassette carriage in detail and in the loading and unloading position and with parts broken away and removed.
Figure 3:
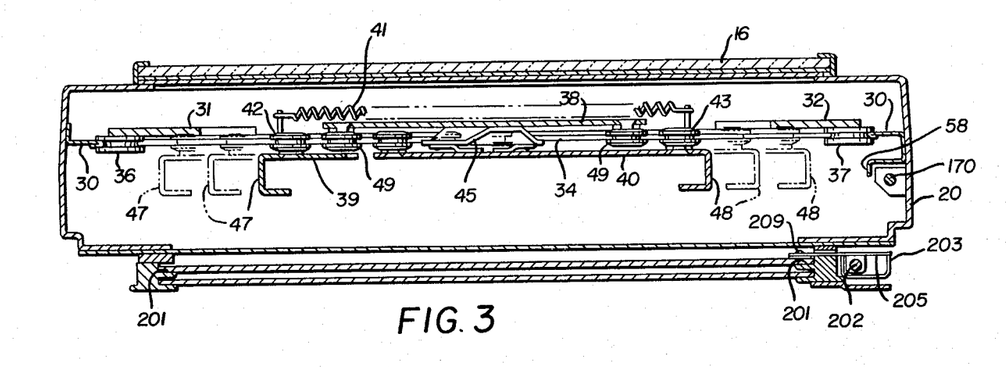
FIGURES 3 and 4 are sectional views of the devices as seen respectively from the planes indicated by the lines 3—3 and 4—4 of FIGURE 2.

The structure of the carriage is shown in FIGURES 1 through 4. In FIGURE 3, a pair of longitudinal guide tracks 30 are visible. These guide tracks 30 are secured to the sides of the frame 20 and provide a track for the rectilinear movement of the carriage 21 from its storage position to its load and unload position, FIGURE 1, and to its intermediate positions which are exposure positions.

The carriage 21 has a frame comprised of a pair of frame side members 31, 32, a pair of frame cross track members 33, 34, and a slide cross member 35. Carriage supporting wheels 36, 37 are journaled respectively on the carriage frame side members 31, 32. The carriage supporting wheels 36, 37 engage the longitudinal guide tracks 30 for supporting the carriage 21 during its rectilinear movement. One of each of the wheels 36, 37 is visible in FIGURE 3, it being understood that there are at least two of each.

The cross carriage 25 is mounted on the carriage 21 for transverse or cross travel. The cross carriage 25 includes a top plate 38 and a pair of movable jaws 39, 40 which are of generally L-shape when viewed from the top as in FIGURE 2. The jaws 39, 40 are respectively mounted for rectilinear cross travel on the cross tracks 33, 34, by wheels 42, 43 and are urged toward one another by a spring 41, FIGURE 3, secured to them. When there is no cassette in the carriage the jaws are urged into abutment by the spring 41.

A jaw coordinating link 45 is pivotally connected to the top plate 38 along the longitudinal centerline of the plate. The jaw coordinating link 45 is also pivotally connected to both of the movable jaws 39, 40. The jaw coordinating link 45 serves to maintain the jaws 39, 40 equal distances from either side of this longitudinal centerline.

The jaws each having downwardly extending cassette-gripping flanges, 47, 48 on the jaws 39, 40. These flanges serve to support a cassette when it is positioned in the carriage. In order to secure proper positioning of the cassette in each of the positions of the device, it is important to have the cassette-supporting flanges 47, 48 symmetrical about the longitudinal centerline of the cross carriage. From the preceding description, it will be apparent that the jaw coordinating link 45 serves to maintain the cassette supporting flanges 47, 48 equidistant from the cross carriage centerline plane at all times so as to properly locate a cassette, transversely speaking, in the cross carriage.

The top plate 38 has wheels 49 journaled on it, FIGURE 3. These wheels 49, like the wheels 42, 43, engage the cross track members 33, 34. The wheels 42, 43, 49 support the cross carriage 25 for cross travel on the carriage 21. Thus, the jaws 39, 40 move, upon loading or unloading of a cassette, relative to one another and relative to the top plate 38. At other times, during the operation of the device as will be explained in greater detail below, the entire cross carriage 25, moves as a unit, relative to the carriage 21 laterally along the cross tracks 33, 34.

The cross carriage 25 has three operative positions, relative to the carriage 21. When viewing the device from the front, these may be referred to as left, right and center positions. This would be movement to the left, right and center respectively in FIGURE 3 or movement to the top, bottom and center respectively in FIGURES 1 and 2.

Left, right and center lock pins 51, 52, 53 are provided. These pins are secured to the top plate 38 in fixed relative positions immediately above the slide cross member 35. The left and center lock pins 51, 53 rivet a lock pin support 54 to the top plate 38. The right-hand lock pin 52, on the other hand, is simply an upstanding pin on the lock pin support 54 as can be seen in FIGURE 1.

A generally L-shaped cross travel position lock 55 is pivotally mounted at 56 on the right side guide 32, FIGURE 2. An examination of FIGURE 2 will show that the pivot 56 is immediately forward of the cross member 35. The lock 55 selectively engages the lock pins 51, 52 and 53 one at a time. FIGURES 1 and 3 show the lock bar in engagement with the center lock pin 53 to lock the cross carriage 25 in its central position.

A roller 57 on the forward end of the lock bar 55 rides on a side cam 58 provided along the right side of the spot filmer frame 20. Coaction of the roller 57 and the cam 58 maintains the lock bar in a position to engage an appropriate one of the lock pins. As will become apparent from an examination of FIGURE 15, the cam 58 permits the lock bar 55 to pivot out of engagement with the lock pins under the urging of a spring (not shown) whenever the carriage is moved to the rearward portion of the spot filmer. In a manner which will be described below, the cross carriage is shifted laterally to the right or to the left as the cassette carriage advances from its storage position. At such times the cross travel position lock will be pivoted into engagement with the appropriate one of the left and right lock pins 51, 52.

A pair of cassette guide chutes 60, 61 are provided on the forward end of the carriage 21. These chutes are visible in FIGURE 2 where it will be seen that they are pivotally connected respectively to the forward ends of the frame side members 31, 32. A side elevational view of the chute 60 is visible in FIGURE 11 and the chute 61 is a mirror image of the chute 60. Each is sized for guiding sliding engagement with a cassette upon insertion of a cassette into the carriage.

Jaw actuation pins 62, 63 are secured respectively to the rearward portions of the chutes 60, 61. The jaw actuation pins extend upwardly from their respective rearward positions. These pins 62, 63 are espectively disposed for sliding rectilinear actuating movement in elongated jaw actuation slots 64, 65, formed in the forward ends of the jaws 39, 40. Whenever a cassette is passed through a front loading opening 66 in the spot filmer, FIGURE 4, into the chutes 60, 61 the action of the cassettes against the chutes will cause the chutes to pivot outwardly. This outward chute movement moves the jaws outwardly an appropriate amount to receive the cassette being loaded.

As suggested above, the action of the jaw coordinating bar 45 will limit the travel of the jaws 39, 40 in a manner to cause equal and opposite travel thereby automatically laterally centering an inserted cassette. The jaws 60, 61 guide the cassette into the cassette supporting flanges 47, 48 such that the cassette is supported vertically and at the same time gripped on its sides by the flanges through the action of the spring 41 pulling the jaws toward one another.

A cassette insertion travel limiter 67 is provided. This travel limiter is an arm which is pivotally mounted near the rearward end of the movable jaw 39 toward the top portion of FIGURE 8 where it is visible. The cassette travel limiter 67 includes a downwardly extending cassette engaging portion 68 which will abut the rearward edge of an inserted cassette. As the cassette moves rearwardly, it will force the engaging projection 68 to move rearwardly with it until a stop pin 69 acts to prevent further rearward movement of the cassette. This stop pin projects upwardly from the travel limiter 67. The stop pin 69 engages an appropriate one of three stop notches 70, 71, 72 on a cassette travel stop plate 73 which is secured to the top plate 38.

A spring 74 is provided to normally bias the travel limiter 67 into its forward position shown in solid lines in FIGURE 2. Commercially available cassettes are referred to as 8″ x 10″ and 10″ x 12″ because of the film sizes they accommodate. They will be so designated here even though in reality they are somewhat larger. Depending on size and position of a cassette, the travel limiter 67 will assume a position relative to the jaw 39 corresponding to one of the three shown phantom positions in FIGURE 10, when it is in engagement with an appropriate one of the stops 70, 71, 72. That is, the travel limiter moves rearwardly relative to the jaw 39 enough to accommodate a cassette having a dimension, measured longitudinally of the spot filmer, of either of two amounts. The travel limiter will move laterally with the jaw to accommodate any of three transverse dimensions. With an 8″ x 10″ cassette positioned with the 8″ dimension transversely in the housing, the pin 69 will engage the stop 70. When the 8″ x 10″ cassette is positioned the other way the pin 69 will engage the stop 71 and the pin will engage the stop 72 when a 10″ x 12″ cassette is in the carriage.

Once rearward travel of the cassette has been arrested by the travel limiter 67, some means must be provided to retain the cassette in its appropriate and inserted position, since, after all, the spring 74 biasing the travel limiter 67 forwardly will also serve to shift the cassette forwardly and eject the cassette. In face, the cassette arrestor 67— as will become apparent during the discussion of the operation of the device—also serves as a cassette ejector at an appropriate time in the cycle.

Figure 6:
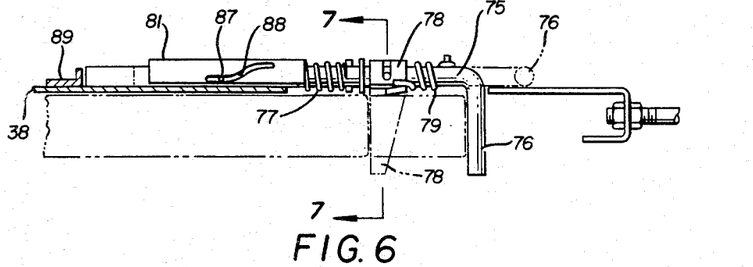
FIGURE 6 is an enlarged sectional view in the cassette lock as seen from the plane indicated by the line 6—6 of FIGURE 1; and, FIGURE 7 is a sectional view as seen from the plane indicated by the line 7—7 of FIGURE 6.
Figure 7:
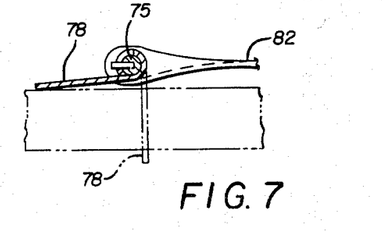

The means to maintain the cassette in its indexed position will best be understood by reference to FIGURES 1, 6, and 7. A cassette lock bar 75 is rotatably and slidably mounted on the top plate 38. The bar 75 includes a large-size cassette retainer 76 which preferably is simply the end portion of the bar 75 bent at right angles with the remainder of the bar. Spring 77 is wound around the bar 75 biasing the bar outwardly and rotatably to the position shown in FIGURE 1. A lock trip 82 is slidably mounted on the top plate 38. The trip includes a downwardly extended rearward projection which overlies the inner end of an inserted cassette. When a cassette is inserted it forces the trip rearwardly which in turn moves the cassette bar 75 rearwardly. A pin 87 on the bar 75 and a groove 88 in a bar support 81, FIGURE 6, cause relative rotation and cause the bar to shift from its storage position shown in phantom in FIGURE 6 to its lock position with the end portion 76 in a vertical position as shown in solid lines. A spring biased lock holder 89 engages a coacting notch on the lock trip 82 to hold it in a locked position, FIGURE 1.

When an 8″ x 10″ cassette is positioned with its 8″ dimension longitudinally, a shorter cassette retainer 78 maintains the cassette in its loaded position. At such time, the projection 78 is biased into a vertical position by a projection spring 79. This vertical position is visible in FIGURE 4 and shown in phantom in FIGURE 7. At all times when a cassette having a longitudinal dimension of a larger size; i.e., 10 inches, is in the carrier, the smaller size cassette holder 78 rests against the top of the cassette as seen in solid lines in FIGURES 6 and 7.

Figure 4:
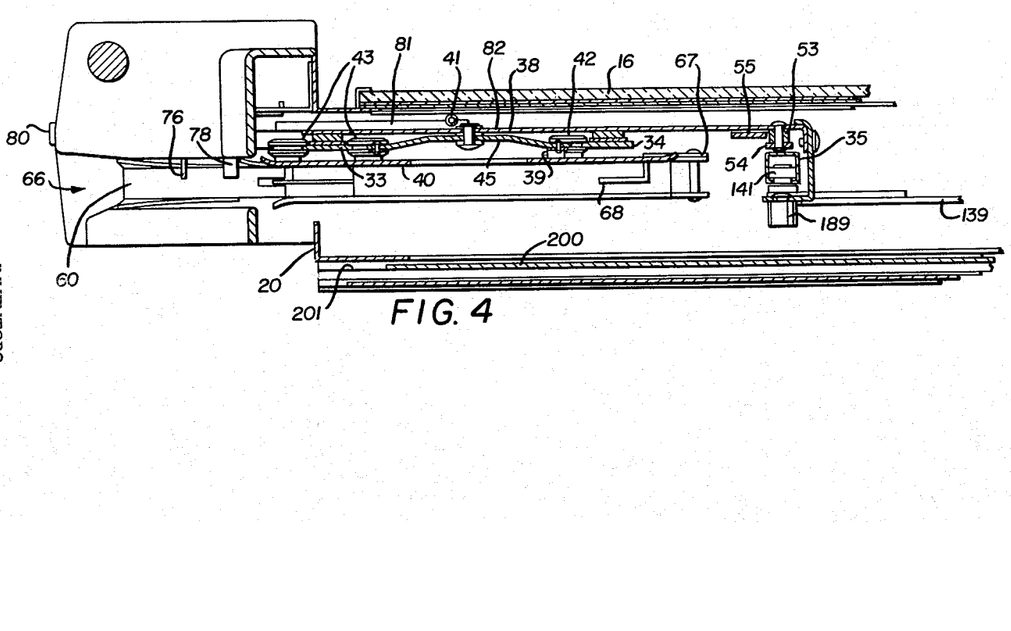

In order to release a cassette and to permit ejection of it, a release button 80, FIGURES 1 and 4, is provided. Depression of the release button 80 will cause the lock 75 to shift rearwardly tripping the lock holder 89 out of its notch and allowing the lock 75, on release of the button 80, to shift axially forwardly, until both cassette holders 76, 78 are in the release position of FIGURE 1. When the bar 75 is rotated, the spring 77 biases the bar forwardly to this release position. When the bar 75 releases the cassette, the travel limiter 67 is urged forwardly by its spring 74 to eject the cassette.

From this description it will be seen that for the first time a cassette carrier has been provided which automatically receives a cassette of any size within the acceptable range of the device in which, by simple rectilinear insertion through a slot, a cassette is automatically centered transversely and positioned appropriately longitudinally relative to the carriage.

*The position control mechanism*

The operation of this position control mechanism will be understood best by reference to FIGURE 1. As previously suggested, this subassembly includes the selector knob 22 which is positioned above a position indicating plate 90. The plate 90 indicates first when the mechanism is set for a given and selected radiographic sequence of exposures and second; what portion of a given and selected sequence has been completed. When the device is in operation, the operator rotates the selector knob 22 to any desired position.

When the selector knob 22 is rotated to a desired position, it drives a lower chain 93. The chain 93 causes a pinion gear 94 to rotate. When the pinion gear 94 is rotated an engaged selector knob control rack 95 is caused to move rectilinearly along a longitudinally path. A connected detent indexing control rack 96 is also caused to move rectilinearly. Further, spaced and parallel longitudinally-disposed sequence control cams 97, 98 are also caused to move rectilinearly. The upper of these sequence control cams 97 is the transverse positioning control cam while the lower of the cams 98 is the longitudinal positioning control cam.

The detent control rack 96 engages a detent control pinion gear 100. The detent control pinion gear 100 is fixed to a ratchet cam 101. Structure, not shown, is provided to retard the movement of the pinion gear and hold it and the connected ratchet cam 101 in an indexed position.

A pawl 105 is biased against the ratchet cam 101. The pawl 105 is secured to indexing bar which reciprocates in slide guides 111, 112. As the detent 105 moves rearwardly, it will index the detent cam 101 one position. This moves the sequence control cams 97, 98 an appropriate distance to provide for the next and subsequent cassette position in a radiographic sequence.

The longitudinal travel assembly 24 and the cross travel assembly 26 which will be described in greater detail below, are respectively, controlled by cam followers 121, 122. These cam followers 121, 122 respectively engage the longitudinal position control cam 98 and the cross travel sequence control cam 97.

A mechanism, not shown, is provided to render the detent 105 and the followers 121, 122 ineffectual at appropriate times. When this occurs the operator may freely rotate the selector knob 22 in either direction to shift the sequence control cams 97, 98 longitudinally to a selected position. Thus, the selector knob 22 and the sequence control cams together with the intermediate elements that mechanically connect these three parts together, form a settable portion of the position control mechanism. Rotation of the selector knob 22 to a desired position indicated by the position indicating plate 90 simultaneously shifts the sequence control cams longitudinally to an appropriate position to produce the sequence selected.

A cam follower release cam which is not shown serves a dual purpose. In addition to rendering the cam followers 121, 122 ineffectual for the purpose of manual setting of the mechanism, it also renders these two followers ineffectual to facilitate automatic indexing of the mechanism to a succeeding position in a radiographic exposure sequence. Thus, the release cam serves to silence the mechanism since the followers 121, 122 are out of engagement with the travel control cams 97, 98 whenever these cams are indexed, whether manually or automatically.

The longitudinal travel assembly

The longitudinal travel assembly 24 can be understood best by reference to FIGURE 1.

A longitudinal travel slide 128 is provided. The slide 128 is rectilinearly movable in a path defined by a pair of slide tracks 129. During any sequential movement of the cassette carriage 21 from its storage position to any one of the more forward positions, the longitudinal travel slide 128 travels substantially the entire length of the tracks 129. The slide 128 travels from a rearward storage position which is not shown in the drawings to the forward position of FIGURE 1 each time the carriage is advanced and it then retracts fully to its storage position each time the carriage is returned to the storage position.

This reciprocal travel of the travel slide 128 is produced by a travel link 130 which is pivotally connected to the frame 20 at 131. The link 130 is connected to the longitudinal travel slide 128 at 132 so that pivotal movement of the link 130 about the pivot 131 will cause reciprocal movement of the slide 128.

Pivotal movement of the travel link 130 is caused by an eccentric link 133. The eccentric link 133 is pivotally connected to the travel link 130 intermediate the connections at 131 and 132. The eccentric link 133 is also pivotally connected at 134 to a projection on an eccentric plate 135, which is driven by a motor.

The longitudinal travel slide 128 is connected to the carriage 21 by a longitudinal travel arm 139. The longitudinal travel arm is pivotally connected to the slide 128 at 140. A roller 141, FIGURE 4, is rotatably mounted on the outer end of the arm 139 and disposed within the slide cross member 35 for coacting longitudinal travel producing engagement.

In order to obtain desired amounts of rotation of the longitudinal travel arm 139, a longitudinally movable carriage travel control rack 143 is provided. The travel arm 139 is formed with a gear segment portion 144 which engages the longitudinal travel control rack 143. The longitudinal travel control rack is fixed to a travel control cam 145. The rack and cam 143, 145 are slidably mounted in rack longitudinal guide tracks 146, FIGURE 1. Restraining of the rack travel control cam 145 in its fully retracted and most rearward position of FIGURE 1 will produce maximum rotation of the travel arm 139 when the slide 128 is advanced. Conversely, permitting the rack travel control cam 145 to travel with the travel arm 139 to its most forward position of the cam 145, will limit the rotation of the travel arm 139 and therefore produce a minimum amount of forward travel of the cassette carriage 21.

An eject rod 170 extends along the right-hand side of the spot filmer substantially throughout the longitudinal length of the frame 20. This rod 170 is visible in FIGURES 1 and 3. The rod is biased normally forwardly by a spring not shown. An ejection button 172 is provided which engages the rod 170. When the eject button 172 is pressed rearwardly, it urges the rod 170 rearwardly with it causing a connecting linkage to move and shift longitudinal arresting lever 155 to an ejection position. When the cassette carriage 21 is returned to its storage position this linkage is reset, by a reset trip 176.

In order to assure the maintenance of the travel control cam 145 in an indexed position, a travel control cam lock 180 is provided. The travel control cam lock 180 is pivotally mounted on the frame and biased to urge a projection 181 on the lock 180 into an appropriate one of a plurality of notches on the rack travel control cam 145. When the carriage is in the storage position a roller 183, FIGURE 1, pivots the lock 180 to its disengaged position. Whenever the carriage 21 moves forwardly, the roller moves out of engagement with the lock 180, permitting it to be biased back to the lock position.

Cross travel assembly

The description of the cross travel assembly 26 will be directed primarily to FIGURE 1. The purpose of the cross travel assembly is to move the cross carriage 25 laterally from the central position to one side or the other to exposure positions. In FIGURE 3 the selector knob 22 is pointing to the designation of the forward left-handed quadrant, may be considered to be the first position. Considering this to be the first position and reading clockwise, the lateral movement of the cross carriage 25 is, then, obtainable in the first six positions. As will be described in greater detail in the electrical section, switches are provided so it is impossible to energize the mechanism in these six positions unless the positioned cassette is sufficiently narrow to permit cross travel without jamming or damaging the mechanism. Thus, in order to obtain cross travel, it is first necessary to either have no cassette in the carriage 21 or to position, in the case of the commercially available cassettes, an 8" x 10" cassette with the 8" dimension transversely with respect to the spot filmer.

The cross travel subassembly 26 includes a central guide track 185 and a track plate 186 is secured to the frame 20. The track plate 186 defines right- and left-hand guide tracks 187, 188. A cross travel control roller 189 is secured to the underside of the carriage, FIGURE 4. This cross travel control roller engages an appropriate one of the three tracks 185, 187, 188 and guides the cross carriage 25 into either a central or a right or a left position.

As has been suggested previously, when the carriage 21 is in the storage position the cross travel lock bar 55 is pivoted out of engagement with the cross travel lock pins 51–53. As the carriage moves forward and the cross carriage is indexed to the right, left, or center, the roller 57 rides up on the cam 58 pivoting the lock bar 55 into locking engagement with an appropriate one of the pins. This pivotal action of the lock bar 55 occurs as the cross travel roller 189 emerges from an indexed one of the three tracks.

In order to index the cross travel roller 189 into the appropriate one of the three tracks, a track switch 190 is provided. The track switch 190 is pivotally mounted on the base of the frame 20. The track switch 190 includes an indexing track 191 which is selectively orientated with one of the three tracks, 185, 187, 188. The positioning of the track switch 190 is controlled by the cross travel cam follower 122 coacting with the cross travel sequence control cam 97.

It is desirable to be able to shift the carriage 21 to the unload position no matter what position the position control mechanism is in. To do this, the track switch should be oriented with the central track 185. The follower 122 is disengaged from the cam 97 when the carriage is in its park position. When the ejection button 172 is depressed for ejection the track switch 190 is locked in its central position.

The electrical circuit

Figure 5:
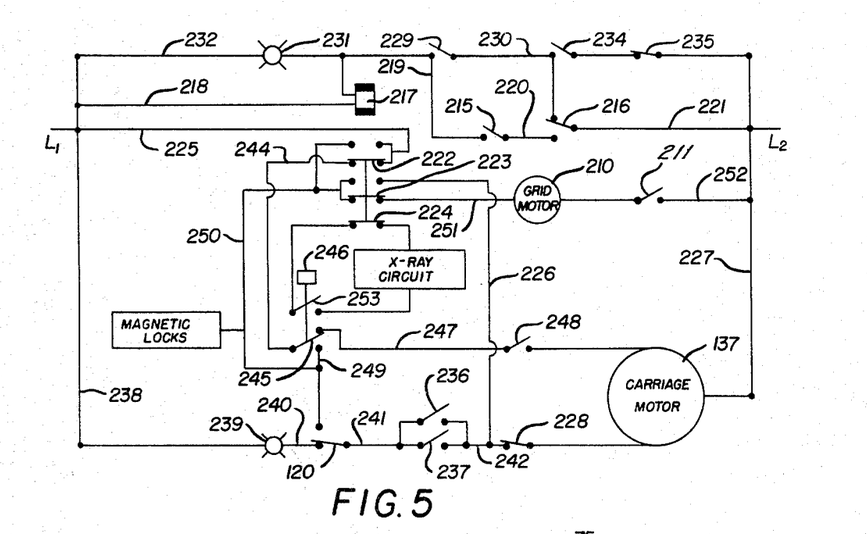
FIGURE 5 is a circuit diagram showing the electrical control circuit.

In FIGURE 5, a wiring diagram of the electrical circuit is shown. The switches in this diagram are positioned as though an exposure sequence had been completed and the spot filmer carriage 21 is in the parked position. When the mechanism is in this position, the operator will wish to depress the eject button 172 and cause the carriage 21 to move to the unload position of FIGURE 1.

When the eject button is pressed an eject switch 215 is closed. Simultaneously a momentary contact eject switch 216 is moved from the position shown in the wiring diagram to close a circuit energizing an eject relay 217. The relay 217, then is energized through a circuit from one side of a line $L_1$, through a conductor 218 to the relay 217 then through conductor 219 to the eject switch 215 which is conected to the momentary eject switch 216 by a conductor 220. The momentary eject switch 216 is in turn connected through a conductor 221 to the other side of the line $L_2$.

When the relay 217 is energized a multiple contact solenoid controlled switch is actuated. This switch has a carriage motor contact 222, a grid motor contact 223, and an X-ray circuit contact 224. With the relay 217 energized this multiple contact switch is moved from the position shown to its other position where carriage motor 137 is energized in a forward direction. The energizing of the carriage motor 137 in a forward direction is accomplished through a conductor 225 which connects the carriage motor contact 222 to $L_1$. The contact 222 is in turn connected through the contact 223 to a conductor 226, which extends to the forward direction side of the carriage motor 137. The carriage motor 137 is connected to the side $L_2$ of the line with another conductor 227.

So long as the eject button 172 is maintained in a depressed condition the momentary eject switch 216 will maintain this described relay energizing circuit closed and the carriage motor will operate to advance the carriage. When the carriage reaches the forward end of its travel two forward limit switches are tripped. One of these, 228 is conected to the conductor 226, breaking the circuit to the carriage motor 137 and stopping its rotation. The other switch which is triggered when the carriage reaches its forward position is a relay hold forward limit switch 229. This switch 229 is closed to parallel the eject switch 215. The relay hold limit switch 229 is connected to one contact of the momentary eject switch 216 by a conductor 230. When the carriage reaches the forward position, if the eject button 172 is maintained in a depressed condition, the previously described circuit will maintain the relay 217 in an energized condition. If the eject button is released, then the relay switch 217 is maintained in an energized condition through the relay hold switch 229 conductor 230, and thence through the momentary eject switch 216 to the line $L_2$ through the conductor 221.

A load light 231 is positioned on the forward end of the housing. This load light is lit whenever the relay 217 is energized. Thus, the load light 231 is connected in parallel with the relay 217 by a conductor 232. The purpose of the load light 231 is to indicate when the carriage is in its forward load and unload position.

A latch sensing switch 234 is mounted on the carriage for energization by the lock 75. The latch switch 234 is open whenever the lock 75 is in its lock position. A cassette-responsive switch 235 is connected in series with the latch switch 234. The cassette-responsive switch is positioned on the carriage for closure whenever a cassette is either partially or fully positioned in the carriage.

Whenever the carriage is in a forward position it cannot retract until either the latch switch 234 or the cassette switch 235 is open. This is true because the forward limit switch 229 is closed and a relay energizing circuit is maintained through the switches 229, 234, 235. Thus, if there is no cassette in the device, the cassette limit switch 235 will be open and the carriage can be retracted. If a cassette is properly positioned in the device, then the lock 75 will be in its locked position and the latch switch 234 will be open. In either event, then, with either no cassette or a properly positioned and locked cassette, the carriage can be retracted to its parked position. At all other times, it is impossible to retract the carriage because both of these switches are closed. Thus, it is impossible to damage the mechanism by retracting the carriage when a cassette is improperly positioned on it.

A pair of forward motion preventing limit switches 236, 237 are provided and connected in parallel. These switches are provided to prevent forward motion of the carriage motor, other than for eject, if the mechanism has a cassette which is too large positioned in the carriage and an operator attempts to advance the carriage in one of the first six radiographic positions. Thus, the switch 237 is a switch which is open if a cassette greater than 8" in width is positioned in the carriage. The parallel switch 237 is automatically open whenever the selector knob 22 is in one of the first six positions. In the wiring diagram both are shown in an open position to designate a cassette of greater than 8" width with the selector knob in one of the first six positions.

A conductor 238 connects a double exposure light 239 to the one side of the line $L_1$. The light 239 is connected, in turn, to double-exposure switch 120 by conductor 240. The double-exposure switch 120 is series connected with the parallel limit switches 236, 237 by conductor 241. They, in turn, are connected to the conductor 226 by another conductor 242. Thus, whenever a radiographic series is completed, the double-exposure switch 120 will move to the position shown in the wiring diagram and the double exposure light will be lit. The double exposure light is a high resistance light so that although it is in series with the carriage motor 137, there is insufficient energy passing through the motor to cause it to drive the carriage in a forward direction. The eject forward circuit which has been described above parallels this double exposure light so that when the eject button is depressed, the carriage motor will drive the carriage forward to the unload position. At the same time, the double exposure light is shunted out. It will relight when the relay is de-energized and remain on when the carriage is returned to the park position until the mechanism is reset to move the double-exposure switch.

When it is desired to return the carriage to its parked position, first as noted above, it is essential that either a cassette is properly positioned and locked or there is no cassette in the carriage. Assuming one or the other of these conditions to be the case, the eject button 172 is again depressed. This time the eject switch 215 is returned to its open position and the momentary eject switch 216 is again moved to the position where it connects the conductors 220 and 221 together. With the switches in this position all circuits which may energize the relay 217 are broken and the multiple-contact solenoid-energized switch returns to the position shown in the drawings.

With the multiple contact switch returned to its de-energized position, the carriage motor contact 222 energizes a motor retract circuit. This retract circuit is from the contact 222 through a conductor 244 and then through a contact 245 of a push button advance switch 246. The contact 245 is connected to the reverse side of the reversible carriage motor 137 by a conductor 247. When the carriage reaches the parked position of FIGURE 15, the reverse limit switch 248 in the conductor 247 will be opened to conclude the reverse travel.

From the preceding discussion it will be seen that the contact 245 of the push button advance switch 246 is connected to the line $L_1$ whenever the solenoid 217 is de-energized. This connection is from the line $L_1$ through the conductor 225, the carriage motor 222, and then conductor 244, to the push button switch contact 245.

Assuming a cassette is loaded, the device is in the parked position and the position control mechanism has been reset to turn off the double exposure light, actuation for an exposure is obtained by depressing the push button advance switch 246. The switch 246 is depressed, the contact 245 energizes a conductor 249 which is connected to the double-exposure switch 120. This energizes the carriage motor in a forward direction since the circuit is completed through the double-exposure switch 120, the conductor 241, one or both of the parallel limit switches 236 and 237, and then through the forward limit switch 228. When the device reaches the forward end of its travel in any of its indexed positions, the forward limit switch 228 is broken to de-energize the motor.

Whenever the push button advance switch 246 is depressed, the circuit for the grid motor 210 is energized. This grid motor energizing circuit is from the contact 245 through the conductor 249 aand thence conductor 250 to the grid contact 223. The grid motor is connected to the contact 223 my another conductor 251 while the motor is connected to $L_2$ by a final conductor 252. The grid limit switch 209 is in this last conductor 252 so that if the grid is in a fully-retracted position, the grid motor will not operate.

Preferably magnetic locks are provided throughout the entire table and spot filmer assembly to lock the various parts in their adjusted position. It will be seen that these magnetic locks are automatically energized through the conductor 250 either whenever the advance switch 246 is depressed or when the eject switch 172 is depressed to energize the relay 217. Thus, the magnetic locks are energized whenever the conductor 250 is energized either by the contact 222 when the relay 217 is energized, or by the contact 245 when the advance switch 246 is depressed.

Similarly, an X-ray circuit is controlled by both the relay 217 and the push button advance switch 246. Whenever the push button advance switch 246 is depressed a contact 253 is closed to energize the X-ray circuit. Depressing of this switch will not energize this circuit, however, if the relay 217 is energized because the X-ray circuit contact 224 breaks the X-ray circuit whenever the relay 217 is energized.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a spot filmer having a frame with a front load opening and a carriage movably mounted on the frame, the combination of:
   (A) means interposed between the frame and the carriage for guiding the carriage through a selected one of a group of radiographic exposure sequences and selectively into a load position adjacent the front load opening;
   (B) jaw means on the carriage for locating and retentively gripping a cassette inserted through said opening in direct rectilinear motion, said jaw means being self adjusting and adapted to receive and retentively grip one at a time cassettes of a variety of sizes; and,
   (C) guide means operably connected to the jaw means for guiding a cassette into said jaws upon insertion through said openings.

2. The device of claim 1 wherein a biased ejection mechanism is mounted on the carriage and abuttable against an inserted cassette and wherein a latching means retains a cassette positioned in the carriage.

3. The device of claim 2 wherein the ejection mechanism biases a positioned cassette against the latching means.

4. The device of claim 2 wherein the latching means includes a manually actuatable release and wherein the mechanism ejects a cassette through the load opening on release of the latching means.

5. In a spot filmer having a frame with a front load opening and a carriage movably mounted on the frame, the combination of:
   (A) means interposed between the frame and the carriage for guiding the carriage through a selected one of a group of radiographic exposure sequences and selectively into a load position adjacent the front load opening;
   (B) jaw means on the carriage for locating and retentively gripping a cassette inserted through said opening in direct rectilinear motion, said jaw means being self adjusting and adapted to receive and retentively grip one at a time cassettes of a variety of sizes; and,
   (C) a pair of chutes mounted on opposite sides of the carriage and including surfaces oriented to guide a cassette into an operative position on said carriage and retentively held by said jaw means.

6. In a spot filmer having a frame with a front load opening and a carriage movably mounted on the frame, the combination of:
   (A) means interposed between the frame and the carriage for guiding the carriage through a selected one of a group of radiographic exposure sequences and selectively into a load position adjacent the front load opening;
   (B) a cross carriage mounted on said carriage for transverse movement;
   (C) the cross carriage including a pair of jaws movably mounted on the cross carriage for retentively gripping a cassette inserted through said opening;
   (D) a spring biasing the jaws toward one another; and,
   (E) coordinating means connected to both of the jaws and to the cross carriage to maintain cassette gripping portions of the jaws symmetrical about a longitudinal centerline of the cross carriage.

7. The spot filmer of claim 6 wherein other means are operatively connected to the cross carriage to locate an inserted cassette centrally longitudinally of the cross carriage.

8. In a spot filmer having a frame with a front load opening and a carriage movably mounted on the frame, the combination of:
   (a) a cross carriage reciprocally mounted on the carriage;
   (b) a pair of jaws reciprocally mounted on the cross carriage and movable rectilinearly toward and away from one another in a path transverse to the spot filmer;
   (c) a coordinating link pivotally mounted on the cross carriage and connected to each of the jaws for maintaining the jaws equidistant from the axis of the pivot;
   (d) means biasing the jaws toward one another;
   (e) said jaws including means to receive and retain a cassette;
   (f) a pair of chutes each pivotally connected to one of the jaws and aligned with the front load opening whereby to guidingly receive a cassette inserted through the front load opening;
   (g) cassette lock means movably mounted on the cross carriage for releasably retaining a cassette on the cross carriage;
   (h) eject means positioned to abut an inserted cassette; and,
   (i) eject biasing means urging the eject means whereby to maintain the eject means in abutment with the cassette and to cause the eject means to eject the cassette through the front load opening upon release of the cassette lock means.

9. The device of claim 8 wherein a carriage lock means is connected to the cross carriage and cam means carried by the spot filmer frame for selectively locking the cross carriage in a select one of a plurality of transversely spaced positions on the carriage.

10. In a spot filmer having a frame with a front load opening and a carriage movably mounted on the frame, the combination of:
(a) a cross carriage reciprocally mounted on the carriage,
(b) a pair of jaws reciprocally mounted on the cross carriage and movable rectilinearly toward and away from one another in a path transverse to the spot filmer,
(c) means biasing the jaws toward one another,
(d) said jaws including means to receive and retain a cassette,
(e) rotatable cassette lock means movably mounted on the cross carriage for releasably retaining a cassette on the cross carriage and adapted to automatically grip and retain a cassette on insertion in the cross carriage,
(f) manually actuatable means on the frame for selectively releasing the cassette lock means; and,
(g) eject means positioned to abut an inserted cassette and to eject the cassette through the front load opening upon release of the cassette lock means.

11. The device of claim 10 wherein the lock means includes first and second longitudinally spaced cassette engagement arms for engaging different sizes of cassettes and one of said arms is pivoted into a storage position upon loading of a large cassette in the carriage.

12. The device of claim 11 wherein the manually actuatable means comprises a spring biased reciprocatable button and a cam adapted to release the cam lock means when the button is depressed.

13. In combination with a spot filmer having longitudinally disposed track means and a front load opening, a carriage assembly comprising:
(a) a carriage mounted on said track means for reciprocal movement toward and away from the front load opening, said carriage including transversely disposed tracks;
(b) a cross carriage mounted on said tracks for movemeans transversely with respect to the carriage, said cross carriage including first and second jaws mounted on the track for movement with respect to one another and with respect to the remainder of the cross carriage;
(c) the cross carriage also including coordinating means connecting the jaws together and maintaining the jaws equally spaced on opposite sides of a longitudinal plane; and,
(d) first and second guide chutes interposed between the carriage and the first and second jaws respectively, each of said chutes being operatively connected to the carriage and to the like numbered jaw, said operable connections including a pivotal connection and a sliding connection.

14. The device of claim 13 wherein each of the chutes is pivotally connected to the carriage and slidably connected to the associated like numbered jaw.

15. In a spot filmer, the improvement which comprises:
(a) a spot filmer carriage;
(b) a cross carriage movably mounted on the carriage for movement transverse of the spot filmer and defining a cassette receiving area;
(c) an eject link pivotally mounted on the cross carriage and having a cassette abutting portion movable toward and away from the cassette receiving area and adapted to engage a cassette upon insertion of cassette into said area;
(d) means connected to the link and biasing the link toward said area; and,
(e) longitudinally and laterally spaced stop means on said carriage, said stop means being engageable with said link selectively to limit rearward movement of said eject link upon an insertion of a cassette and thereby positioning the cassette longitudinally in the cross carriage.

16. The device of claim 15 wherein the cross carriage includes jaws transversely movable relative to the carriage and wherein said eject mechanism is connected to one of the jaws and wherein said stop means are both transversely and longitudinally spaced.

17. The device of claim 16 wherein the stop means includes three longitudinally and transversely spaced stops for engaging said eject member.

18. The device of claim 15 wherein a latching mechanism is mounted on the cross carriage and adapted to latch a cassette in the cross carriage against the action of the eject mechanism.

19. In combination with a spot filmer having longitudinally disposed track means and a front load opening, a carriage assembly comprising:
(a) a carriage mounted on said track means for reciprocal movement toward and away from the front load opening, said carriage including transversely disposed tracks;
(b) a cross carriage mounted on said tracks for movement transversely with respect to the carriage, said cross carriage including a pair of jaws movable transversely with respect to one another and with respect to the remainder of the cross carriage;
(c) the cross carriage also including coordinating means connecting the jaws together and maintaining them equally spaced on opposite sides of a longitudinal plane; and,
(d) chute means between the carriage and the jaws for guiding a cassette into the cross carriage.

20. The device of claim 19 wherein:
(a) an eject link is pivotally mounted on the cross carriage and has a cassette abutting portion movable toward and away from a cassette receiving area, said link being adapted to engage a cassette upon insertion in the cross carriage;
(b) a means biases the link toward said area; and,
(c) longitudinally spaced stop means are on said carriage for limiting movement of said eject mechanism upon an insertion of a cassette.

21. In a spot filmer having a front load opening, a carriage member and a cross carriage having a load position adjacent said opening, the improvement which comprises:
(a) first and second jaws mounted on the cross carriage and laterally movable relative to one another and to the cross carriage;
(b) first and second laterally movable guide means mounted on opposite sides of said front load opening when the carriage and cross carriage are in said load position; and,
(c) connection means forming operative connections between each jaw and the like numbered guide means to coordinate the lateral movement of the jaws and guide means and orient them to receive and retain a cassette of any lateral dimension between maximum and minimum limits of the jaws.

22. In a spot filmer having a front load opening, a carriage member and a cross carriage having a load position adjacent said opening, the improvement which comprises:
(a) first and second jaws mounted on the cross carriage and laterally movable relative to one another and to the cross carriage;
(b) a cassette locating member mounted on the cross carriage and adapted to limit longitudinal movement of a cassette and thereby locate a cassette longitudinally upon insertion into the jaws;
(c) said locating member being operatively connected to one of the jaws for lateral movement therewith; and,
(d) one of said members including a plurality of laterally and transversely spaced stops abuttable with the other member selectively and one at a time to limit rearward movement of the locating member and thereby coordinate the longitudinal location of a cassette to the transverse location thereof.

23. The device of claim 22 wherein there are:
(a) first and second laterally movable guide means mounted on opposite sides of said front load opening when the carriage and cross carriage are in said load position; and, (b) connection means forming operative connections between each jaw and the like numbered guide means to coordinate the lateral movement of the jaws and guide means and orient them to receive and retain a cassette of any lateral dimension between maximum and minimum limits of the jaws.

24. In a spot filmer having a front load opening and a carriage member and a cross carriage having a load position adjacent said opening, the improvement which comprises:

(a) first and second jaws mounted on the cross carriage and laterally movable relative to one another and to the cross carriage;

(b) longitudinal cassette position locating means carried by the carriage and adjustably delineating the rearward boundary of a cassette receiving area, the locating means having a plurality of lonigtudinally spaced cassette stop positions, said locating means being operatively connected to one of the jaws and responsive to jaw movement such that jaw movement shifts the locating means to a stop position coordinated to the width of the cassette.

25. In a cross carriage for a spotfilmer, the improvement comprising:

(a) first and second laterally adjustable and movable side members delineating adjustable sides of a cassette receiving area;

(b) first and second longitudinally adjustable and movable end members delineating adjustable ends of said area; and, (c) coordinating means connected to the members for controlling the movement of each of the members and responsive to the size of an inserted cassette selected from a group of cassettes of a variety of sizes to cause each of the members to retentively grip an inserted cassette of any size within the capacity of the spotfilmer and center the inserted cassette longitudinally and laterally on the cross carriage.

References Cited by the Examiner
UNITED STATES PATENTS

| | | | |
|---|---|---|---|
| 2,552,858 | 5/51 | Mueller et al. | 250—66 X |
| 2,834,890 | 5/58 | Bastin et al. | 250—66 |
| 2,858,445 | 10/58 | Kizaur et al. | 250—66 |
| 2,890,346 | 6/59 | Kizaur et al. | 250—66 |
| 2,921,202 | 1/60 | Berger et al. | 250—66 X |
| 2,924,717 | 2/60 | Koerner et al. | 250—66 |
| 3,048,696 | 8/62 | Koerner et al. | 250—66 |
| 3,069,544 | 12/62 | Kizaur | 250—66 |
| 3,105,903 | 10/63 | Sano et al. | 250—66 |

RALPH G. NILSON, *Primary Examiner.*